United States Patent
Prohaska (10) Patent No.: US 7,772,969 B2
(45) Date of Patent: Aug. 10, 2010

(54) VEHICLE WITH ALWAYS FORWARD SYSTEM

(76) Inventor: Dean P. Prohaska, 10112 Standing Oak Dr., Schofield, WI (US) 54476

( * ) Notice: Subject to any disclaimer, the term of this patent is extended or adjusted under 35 U.S.C. 154(b) by 370 days.

(21) Appl. No.: 11/737,368

(22) Filed: Apr. 19, 2007

(65) Prior Publication Data
US 2008/0258889 A1 Oct. 23, 2008

(51) Int. Cl.
*B60Q 1/00* (2006.01)
(52) U.S. Cl. .................. 340/438; 340/524; 340/686.1; 340/691.1; 340/426.22; 180/326; 180/333
(58) Field of Classification Search ............. 340/465, 340/488, 684, 573.1, 552–557, 438, 426.24, 340/426.25, 501, 517, 521, 691.1, 691.4, 340/691.5, 686.1, 426.22; 37/348, 413, 466, 37/382, 308; 701/50; 180/326, 333, 330, 180/324, 6.48, 314, 89.13
See application file for complete search history.

(56) References Cited

U.S. PATENT DOCUMENTS

| | | | |
|---|---|---|---|
| 3,357,513 | A | 12/1967 | Sundberg |
| 4,059,171 | A | 11/1977 | Pakosh |
| 4,066,143 | A | 1/1978 | Umeda et al. |
| 5,038,887 | A | 8/1991 | Sousek |
| 5,052,512 | A | 10/1991 | Pakosh et al. |
| 5,086,869 | A | 2/1992 | Newbery et al. |
| 5,198,800 | A * | 3/1993 | Tozawa et al. ............ 340/573.1 |
| 5,346,035 | A | 9/1994 | Ueda et al. |
| 5,377,777 | A * | 1/1995 | Moore et al. ................. 180/272 |
| 5,424,623 | A * | 6/1995 | Allen et al. ............. 318/568.18 |
| 5,757,158 | A | 5/1998 | Ferguson et al. |
| 6,086,142 | A * | 7/2000 | Simmons et al. ....... 296/190.01 |
| 6,152,248 | A | 11/2000 | Hidaka et al. |
| 6,158,539 | A * | 12/2000 | Isley ........................ 180/89.14 |
| 6,282,477 | B1 * | 8/2001 | Gudat et al. ................... 701/50 |
| 6,450,284 | B1 * | 9/2002 | Sakyo et al. ................. 180/329 |
| 6,694,240 | B1 * | 2/2004 | Swick et al. ................... 701/50 |
| 6,971,471 | B2 | 12/2005 | Baker et al. |
| 6,980,896 | B2 * | 12/2005 | Stamerra ...................... 701/50 |

(Continued)

OTHER PUBLICATIONS

Genie Industries, Genie Operator's Manual with Maintenance Information S-60, S-65, manual, Aug. 2006. 42 pages, Fourth Edition, Second Printing, Genie Industries, USA.

*Primary Examiner*—Davetta W Goins
*Assistant Examiner*—Hoi C Lau
(74) *Attorney, Agent, or Firm*—Michael Best & Friedrich LLP (57) ABSTRACT

A system for a vehicle that includes a movable chassis and an operator station rotatable relative to the chassis. The system includes a sensor, an indicator assembly, and a controller. The sensor can detect an orientation of the operator station relative to the chassis, and generates a signal indicative of the orientation of the operator station. The indicator assembly is disposed on the operator station, and includes a first indicator indicative of the operator station oriented in a first direction, and a second indicator indicative of the operator station oriented in a second direction. The controller is in communication with the sensor to receive the signal indicative of the operator station orientation from the sensor, and further is in communication with the indicator assembly to selectively vary the indicator assembly between the first indicator and the second indicator based on the signal indicative of the operator station orientation.

27 Claims, 4 Drawing Sheets

U.S. PATENT DOCUMENTS

| | | | |
|---|---|---|---|
| 2002/0030397 A1* | 3/2002 | Tamura et al. | 298/17 R |
| 2002/0192026 A1* | 12/2002 | Somero et al. | 404/118 |
| 2003/0127272 A1* | 7/2003 | Baker et al. | 180/326 |
| 2003/0230447 A1* | 12/2003 | Wulfert et al. | 180/329 |
| 2004/0211616 A1* | 10/2004 | Ueda et al. | 180/326 |
| 2005/0027420 A1* | 2/2005 | Fujishima et al. | 701/50 |
| 2005/0034915 A1 | 2/2005 | Kumazawa | |
| 2005/0126054 A1* | 6/2005 | Stamerra | 37/347 |
| 2005/0150142 A1* | 7/2005 | Matsuda et al. | 37/414 |
| 2006/0027405 A1 | 2/2006 | Witzenberger | |
| 2006/0061122 A1* | 3/2006 | Billger et al. | 296/65.07 |
| 2007/0010925 A1* | 1/2007 | Yokoyama et al. | 701/50 |
| 2007/0085379 A1* | 4/2007 | Murakami | 296/190.03 |
| 2007/0164873 A1* | 7/2007 | Yamada et al. | 340/679 |
| 2008/0047245 A1* | 2/2008 | MacGregor et al. | 56/10.8 |
| 2008/0223630 A1* | 9/2008 | Couture et al. | 180/9.32 |
| 2009/0038862 A1* | 2/2009 | Hammonds | 180/6.48 |

* cited by examiner

VEHICLE WITH ALWAYS FORWARD SYSTEM

BACKGROUND

The present invention relates to a vehicle that includes a movable chassis and a cabin rotatable relative to the chassis. More particularly, the present invention relates to a system for a vehicle that senses an orientation of a cabin or work platform of the vehicle that is rotatable relative to a vehicle chassis, and that enables movement of the vehicle regardless of the orientation of the cabin.

Generally, vehicles such as work machines or service vehicles (e.g., asphalt compactors, excavators, etc.) move in generally forward and rearward directions depending on the work being done. These vehicles typically include a chassis or base, an operator compartment or cabin or platform coupled to the base, and movement controls for moving the vehicle in the generally forward or rearward directions. Most vehicles include a chassis that has bi-directional movement, but an operator positioned in the operator compartment can only a face a direction toward a forward end of the vehicle regardless of the direction of vehicle travel. The limited orientation of the operator in these vehicles restricts and may obstruct the field of vision of the operator relative to the direction of travel.

In some vehicles, the operator compartment can be rotated relative to the base such that the operator can face the forward end and a rearward end of the vehicle. Vehicle controls for operating these vehicles can be provided in two positions within the operator compartment (i.e., one set of controls toward a forward end of the vehicle and another set of controls toward a rearward end of the vehicle) such that one set of controls can be used when the operator faces the forward end, and the other set of controls can be used when the operator faces the rearward end. Alternatively, the controls can rotate with the operator compartment. However, operation of the vehicle controls can be confusing to the operator when the operator compartment is oriented in a rearward-facing direction. In addition, when a vehicle has been stopped for a prolonged time period, the operator may have difficulty determining which direction is the forward direction, and may engage the vehicle controls to move the vehicle in an unintended direction.

Some existing vehicles also include a control device that senses an orientation of the operator compartment, and that rearranges or reprograms the vehicle controls based on the orientation of the operator compartment. Other vehicles include transmission controls that automatically switch a transmission of the vehicle between a forward control condition to a rearward control condition when the operator compartment is turned between a forward-facing position and a rearward-facing position. In these vehicles, the control condition of the vehicle is fully dependent on the orientation of the operator compartment.

SUMMARY

In one embodiment, the invention provides a system for a vehicle that includes a movable chassis and a cabin that is rotatable relative to the chassis. The system includes a sensor, an indicator assembly, and a controller. The sensor can detect an orientation of the cabin relative to the chassis, and generates a signal indicative of the orientation of the cabin. The indicator assembly is disposed on the operator station, and includes a first indicator indicative of the operator station oriented in a first direction, and a second indicator indicative of the operator station oriented in a second direction. The controller is in communication with the sensor to receive the signal indicative of the operator station orientation from the sensor. The controller is further in communication with the indicator assembly to selectively vary the indicator assembly between the first indicator and the second indicator based on the signal indicative of the operator station orientation.

In another embodiment, the invention provides a method of operating a system for a vehicle that includes a movable chassis and a cabin that is rotatable relative to the chassis. The method includes sensing an orientation of the cabin relative to the chassis with a sensor, generating a signal indicative of the cabin orientation, delivering the signal to a controller, and selectively varying an indicator assembly between a first indicator and a second indicator of the indicator assembly based on the signal indicative of the cabin orientation.

In yet another embodiment, the invention provides a method of operating a vehicle that includes a movable chassis having a forward end and a rearward end, a cabin that is rotatable relative to the chassis, and a chassis movement control. The method includes providing a direction control system in communication with a transmission of the chassis, and providing a switch mechanism in communication with the direction control system. The method further includes orienting the cabin in one of a forward-facing direction and a rearward-facing direction, enabling the direction control system by engaging the switch mechanism, engaging the chassis movement control and moving the chassis movement control in a direction indicative of forward chassis movement, and moving the vehicle in the direction of orientation of the cabin in response to the direction control system being enabled regardless of the cabin being oriented in the forward-facing direction or the rearward-facing direction.

In yet another embodiment, the invention provides a system for a vehicle that includes a movable chassis having a transmission, a forward end and a rearward end, an operator station rotatable relative to the chassis, and a chassis movement control. The system includes a sensor that detects an orientation of the operator station relative to the chassis, and generates a signal indicative of the orientation of the operator station. The system also includes an indicator assembly, a direction control system, and a controller. The indicator assembly is disposed on the operator station, and includes a first state indicative of the operator station oriented in a first direction, and a second state indicative of the operator station oriented in a second direction. The direction control system is in communication with the transmission and with the chassis movement control, and facilitates movement of the vehicle in the direction of orientation of the operator station in response to engagement of the chassis movement control in a direction indicative of forward chassis movement regardless of the operator station being oriented in a forward-facing direction or a rearward facing direction. The controller is in communication with the sensor to receive the signal indicative of the operator station orientation from the sensor, and is further in communication with the indicator assembly to selectively vary the indicator assembly between the first state and the second state based on the signal indicative of the operator station orientation.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
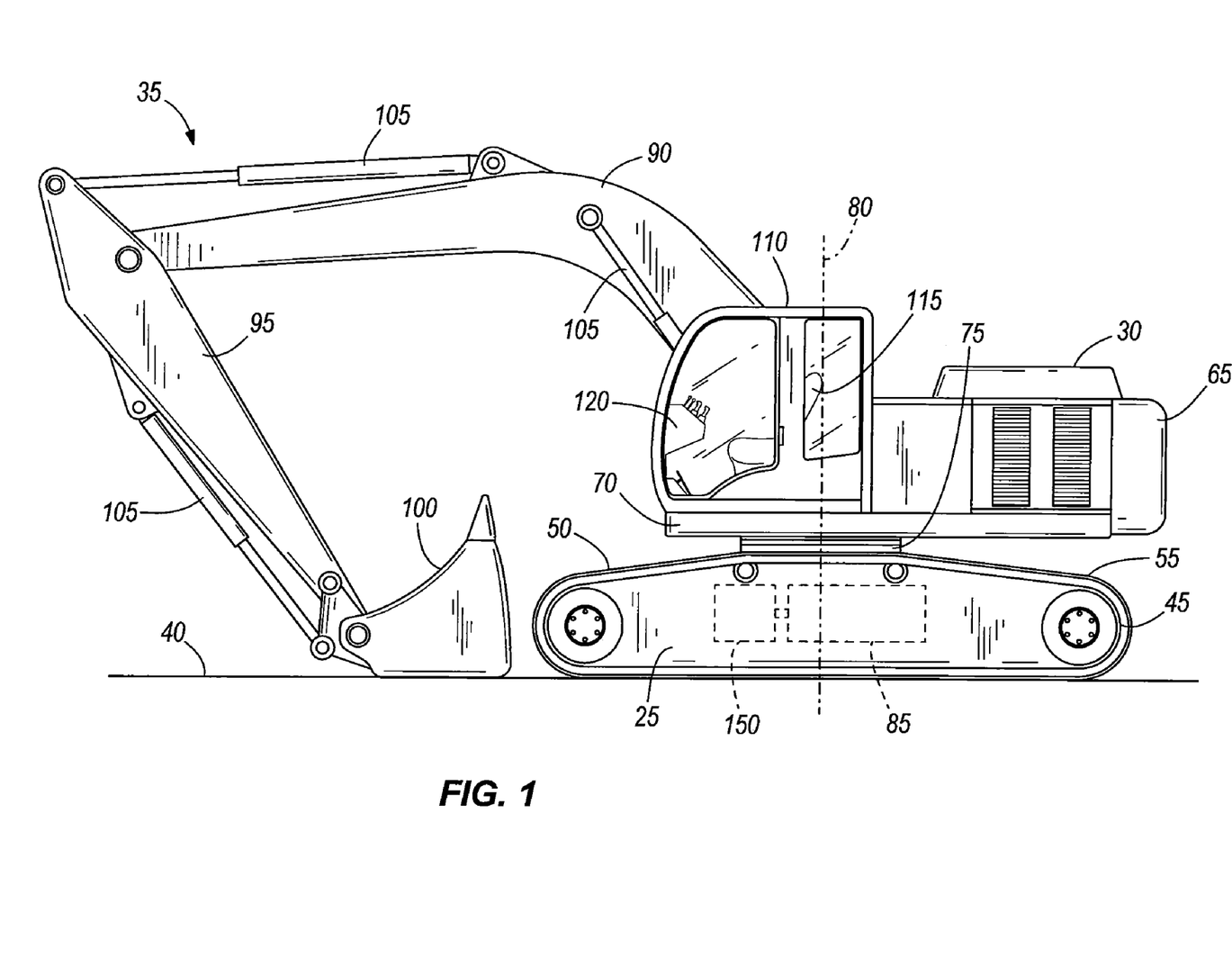
FIG. 1 is a side view of an exemplary vehicle employing the present invention.
Figure 2:
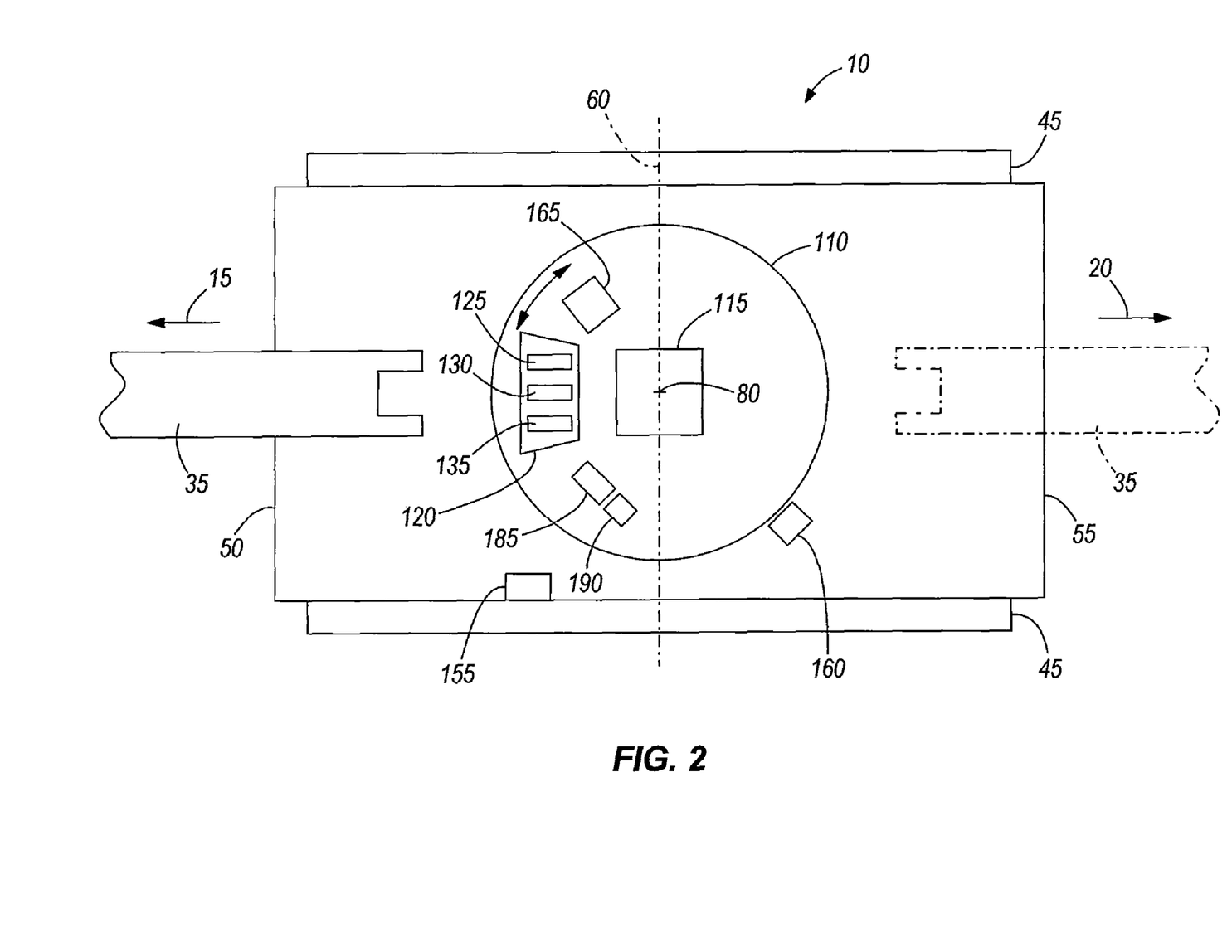
FIG. 2 is a schematic top view of the vehicle of FIG. 1.

FIG. 1 shows an exemplary vehicle or work machine 10 for residential and/or industrial applications (e.g., excavation, construction, demolition, mining, etc.). The vehicle 10 is bi-directional such that the vehicle 10 can be operated in a forward direction 15 and a rearward direction 20 (FIG. 2). In the embodiment illustrated in FIG. 1, the vehicle 10 is an excavator for breaking-up hard soils, rock, or concrete, as well as other operations. In other embodiments, the vehicle 10 can be a crane, a lift, a scrap mover, a tree processor, a trencher, a pavement roller machine, or other work machines. Hereinafter, the term "vehicle" shall be used to represent all such bi-directional work machines for residential and/or industrial applications, and shall not be construed to limit the scope of the invention solely to excavators.

The vehicle 10 includes a lower frame or chassis 25, a prime mover or engine 30, and a working attachment 35. The chassis 25 illustrated in FIG. 1 is supported above a surface 40 by track portions 45, and includes a forward end 50 and a rearward end 55. In other embodiments, the chassis 25 may be supported above the surface 40 by a plurality of wheels (not shown). For purposes of describing the present invention, the phrase "track portions" shall be used to represent all apparatus to support the chassis 25 above the surface 40 and to facilitate movement thereof, and shall not be construed to limit the scope of the invention solely to track portions.

As shown in FIG. 2, an axis 60 extends laterally through the vehicle 10 and separates the vehicle 10 into approximately equal portions. Generally, the forward end 50 of the chassis 25 is defined by the portion of the vehicle 10 that is forward of the axis 60 (i.e., the portion of the vehicle 10 to the left of the axis 60 in FIG. 2). The rearward end 55 of the chassis 25 is defined by the portion of the vehicle 10 that is rearward of the axis 60 (i.e., the portion of the vehicle 10 to the right of the axis 60 in FIG. 2).

Generally, a portion of the vehicle 10 is rotatable relative to the chassis 25, and is defined as an operator station of the vehicle 10. The operator station is rotatably coupled to the chassis 25 via a vertical shaft 75 that defines a vertical axis 80. In some embodiments, a hydraulic system (not shown) is coupled between the chassis 25 and the rotatable operator station to operatively control lateral rotational movement of the operator station about the vertical axis 80. In other embodiments, a mechanical or electro-mechanical system may be employed to rotate the operator station relative to the chassis 25.

The prime mover 30 is substantially enclosed by a housing 65 that is supported by a platform or base 70. In some embodiments, the operator station includes the platform 70 such that the platform 70 is rotatable about the axis 80 relative to the chassis 25. In these embodiments, a hydraulic system (not shown) is coupled between the chassis 25 and the platform 70 to operatively control lateral rotational movement of the platform 70. Other systems may also be employed (e.g., mechanical, electro-mechanical systems) to rotate or move the platform 70 relative to the chassis 25.

Figure 3:
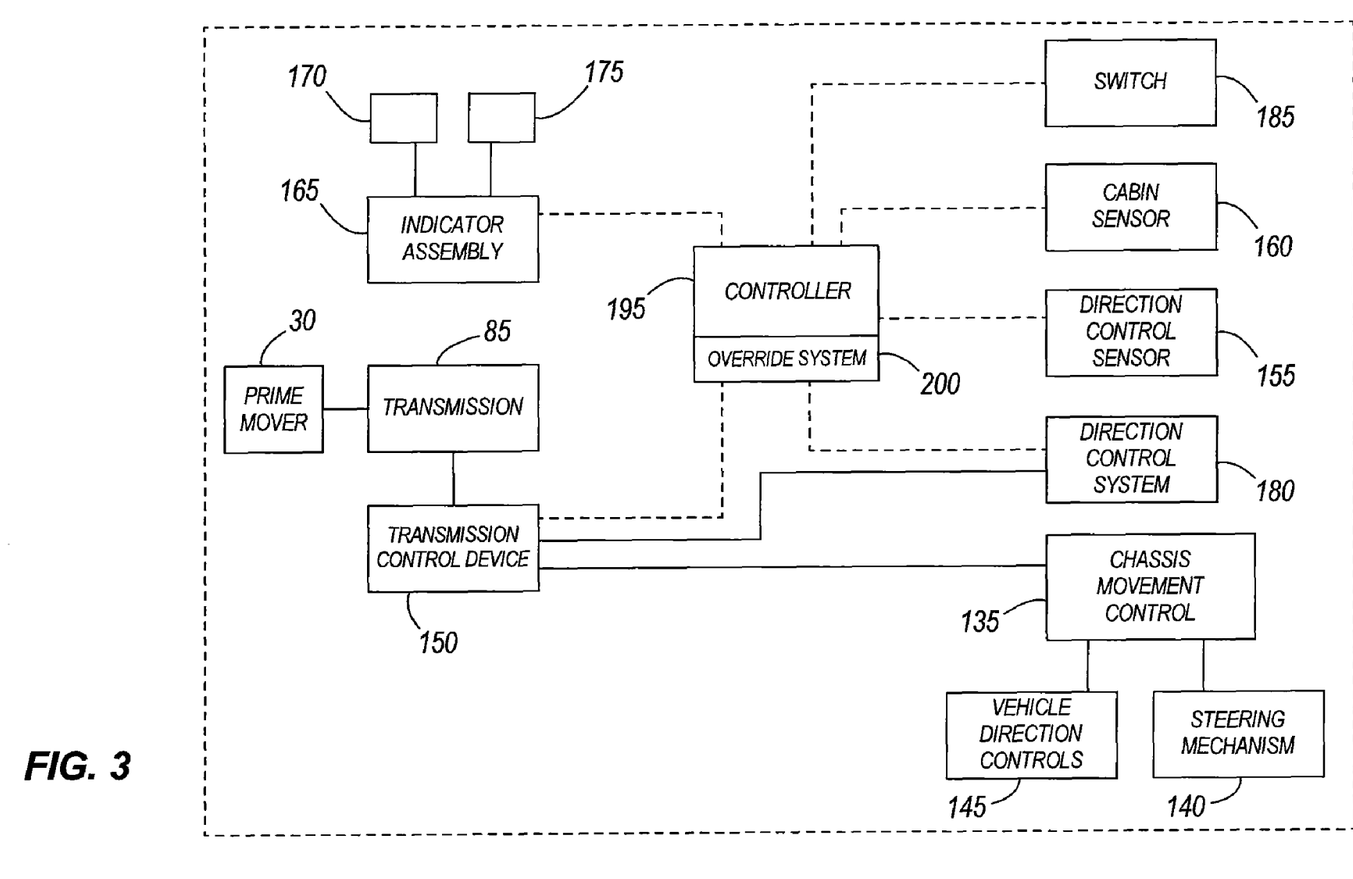
FIG. 3 is a schematic view of the vehicle of FIG. 1.

FIGS. 1 and 3 show that the chassis 25 also includes a transmission 85 coupled to the track portions 45 and that is operatively driven by the prime mover 30 to move the vehicle 10 in the forward direction 15 and the rearward direction 20. In some embodiments, the transmission 85 includes a hydraulic system (not shown) to engage the track portions 45 and to move the vehicle 10. In other embodiments, the transmission 85 can include a mechanical or electro-mechanical system (not shown) to engage the track portions 45 and to move the vehicle 10.

The working attachment 35 is attached to the vehicle 10 on the platform 70. In the illustrated embodiment, the working attachment 35 includes a boom 90, an arm 95 pivotally coupled to the boom 90, and a bucket 100 pivotally coupled to the arm 95. The boom 90, the arm 95, and the bucket 100 cooperatively work together via hydraulic cylinders 105 coupled to a hydraulic system (not shown) of the vehicle 10. The working attachment 35 is a conventional excavator boom, and will not be described in detail. In other embodiments, the vehicle 10 may include other working attachments (e.g., crane boom apparatus, etc.). In still other embodiments, the vehicle 10 may be without a working attachment (e.g., pavement roller machines, etc.).

FIGS. 1 and 2 show that the vehicle 10 further includes a cabin or operator compartment 110 coupled to the platform 70 and positioned adjacent to the housing 65. In some embodiments, the rotatable operator station includes the cabin 110 such that the cabin 110 is rotatable about the axis 80 relative to the chassis 25, with the platform 70 remaining fixed relative to the chassis 25. The operator station including the cabin 110 is generally rotatable relative to the chassis 25 about the vertical axis 80 through one complete revolution, or an angle of rotation of 360 degrees. In some embodiments, the operator station can be located at the end of the working attachment 35 (e.g., lifts, etc.) such that the platform 70 can rotate about the axis 80 and the cabin 110 remains fixed relative to the platform 70.

As shown in FIG. 2, the cabin 110 faces the forward direction 15 when the cabin 110 is oriented to face the forward end 50 of the chassis 25. The cabin 110 faces the rearward direction 20 when the cabin 110 is oriented to face the rearward end 55 of the chassis 25. In other words, when the cabin 110 is oriented to face toward the left side of the axis 60 as viewed in FIG. 2, the cabin 110 is oriented in a forward-facing direction. When the cabin 110 is oriented to face toward the right side of the axis 60, the cabin 110 is oriented in a rearward-facing direction. In some embodiments, the cabin 110 is oriented in the forward-facing direction when the cabin faces a direction directly along the axis 60. In other embodiments, the cabin 110 is oriented in the rearward-facing direction when the cabin faces a direction directly along the axis 60.

The cabin 110 forms an enclosure that includes a seat 115 and an operator console 120. The seat 115 is located within the cabin 110 such that an operator sitting in the seat 115 can view and/or manipulate the operator console 120 while at the same time view operation of the working attachment 35. In some embodiments, the rotatable operator station includes the seat 115 and/or the operator console 120, with the cabin 110 fixed relative to the chassis 25. Thus, the seat 115 and/or the operator console 120 are rotatable within the cabin 110 about the axis 80. Rotation of the operator station including the seat 115 and/or the operator console 120 can be controlled by hydraulic, mechanical, or electrical means.

The rotatable operator station described above broadly covers the embodiments of the rotatable portion of the vehicle 10 that include the platform 70, the cabin 110, the seat 115, and/or the operator console 120. As such, the rotatable operator station includes any one of the platform 70, the cabin 110, the seat 115, and the operator console 120, or any combination of these components, and shall not be construed to limit the scope of the invention.

FIG. 2 shows that the operator console 120 is positioned adjacent to the seat 115 within the cabin 110 and generally within reach of the operator. The operator console 120 includes a working attachment control 125, a cabin orientation control 130, and a chassis movement control 135. In some embodiments, the cabin orientation control 130 and the chassis movement control 135 can be part of an integrated control system such that the operator need only operate the integrated control system to move the chassis 25 or to rotate the cabin 110. The working attachment control 125 is positioned adjacent to the seat 115, and is in communication with the hydraulic cylinders 105 such that the operator can manipulate the working attachment 35.

With reference to FIG. 2, the cabin orientation control 130 is located within the cabin 110 adjacent to the working attachment control 125. In some embodiments, the cabin orientation control 130 includes one or more levers or controls (not shown) coupled to a hydraulic, mechanical, or electro-mechanical system (not shown) of the vehicle 10 that facilitates rotation of the cabin 110 relative to the chassis 25. The cabin orientation control 130 is movable between two or more positions such that the cabin 110 can be selectively rotated about the vertical axis 80.

FIG. 2 shows that the chassis movement control 135 is located adjacent to the seat 115 for manipulation by the operator. FIG. 3 shows that the chassis movement control 135 is coupled to the transmission 85 via a transmission control device 150 to move the vehicle in a desired direction, and includes a steering mechanism 140 and vehicle direction controls 145. In some embodiments, the steering mechanism 140 and the vehicle direction controls 145 can be combined into a unitary assembly for combined manipulation by the operator. In other embodiments, the steering mechanism 140 and the vehicle direction controls 145 can be separate devices for separate or independent manipulation by the operator.

The steering mechanism 140 is coupled to the transmission 85 to orient the vehicle 10 in a desired direction using the track portions 45, and can be hydraulically or mechanically operated. In some embodiments, the steering mechanism 140 can be a steering wheel. In other embodiments, the steering mechanism 140 can be one or more levers or other similar controls.

The vehicle direction controls 145 are coupled to the transmission 85 via the transmission control device 150 to move the chassis 25 in a desired direction (e.g., the forward direction 15, the rearward direction 20, etc.), and can be hydraulically or mechanically operated. In some embodiments, the vehicle direction controls 145 include one or more levers (not shown). The vehicle direction controls 145 are movable to one or more first or forward positions to move the vehicle in the forward direction 15 at one or more forward speeds. The vehicle direction controls 145 are further movable to one or more second or rearward positions to move the vehicle 10 in the rearward direction 20 at one or more rearward speeds. The chassis movement control 135 is moved in a direction indicative of forward chassis movement when the vehicle direction controls 145 are moved to a respective forward position. Likewise, the chassis movement control 135 is moved in a direction indicative of rearward chassis movement when the vehicle direction controls 145 are moved to a respective rearward position.

The transmission control device 150 is coupled between the chassis movement control 135 and the transmission 85 to communicate a desired direction of the vehicle 10 from the steering mechanism 140 and/or the vehicle direction controls 145 to the transmission 85. In embodiments that include a hydraulic transmission 85, the transmission control device 150 can include a hydraulic control valve (not shown) to communicate the desired direction from, for example, an internal location (e.g., center swing shaft of the vehicle, etc.). In embodiments that include a mechanical or electro-mechanical transmission 85, the transmission control device 150 can communicate the desired direction via mechanical or electro-mechanical means (not shown).

FIG. 2 shows that the vehicle also includes a direction control sensor 155 in communication with one of the track portions 45 to detect movement of the chassis 25 in the forward direction 15 or the rearward direction 20, and to generate a signal indicative of the sensed chassis movement. More than one direction control sensor 155 can also be employed on the vehicle 10 to sense chassis movement based on movement of both track portions 45. In the illustrated embodiment, the sensor 155 is an electrical sensor that generates an electrical signal. In some embodiments, chassis movement can be sensed by a mechanical or electro-mechanical sensor. In other embodiments, the direction control sensor 155 can detect movement of the chassis 25 based on the position of the vehicle direction controls 145. In still other embodiments, the direction control sensor 155 can be placed in communication with the transmission 85 to sense chassis movement.

FIGS. 2 and 3 show that the vehicle 10 also includes a cabin sensor 160 and an indicator assembly 165. The cabin sensor 160 is generally in communication with the cabin 110 to detect an orientation of the cabin 110 relative to the chassis 25. More particularly, the cabin sensor 160 is configured to detect whether the cabin 110 is oriented in the forward-facing direction or the rearward-facing direction, and configured to generate a signal indicative of the orientation of the cabin 110. In some embodiments, the cabin sensor 160 can be an electrical sensor in communication with the cabin 110 to electrically detect the orientation of the cabin 110 (e.g., electronic position sensor). In other embodiments, the cabin sensor 160 can be a mechanical sensor coupled to the cabin 110 to mechanically sense the orientation of the cabin 110. Other sensors that detect the orientation of the cabin 160 are also possible. In still other embodiments, cabin orientation can be detected based on a position of the cabin orientation control 130, or alternatively, based on the orientation of the vertical shaft 75 relative to the chassis 25.

The indicator assembly 165 is positioned in the cabin 110 such that the indicator assembly 165 is viewable by the operator and rotatable with the cabin 110. The indicator assembly 165 is variable between a first state that is indicative of the cabin 110 being oriented in the forward-facing direction, and a second state that is indicative of the cabin 110 being oriented in the rearward-facing direction. When the cabin 110 is oriented in the forward-facing direction, the first state is activated and the second state is deactivated. When the cabin 110 is oriented in the rearward-facing direction, the second state is activated and the first state is deactivated.

Figure 4:
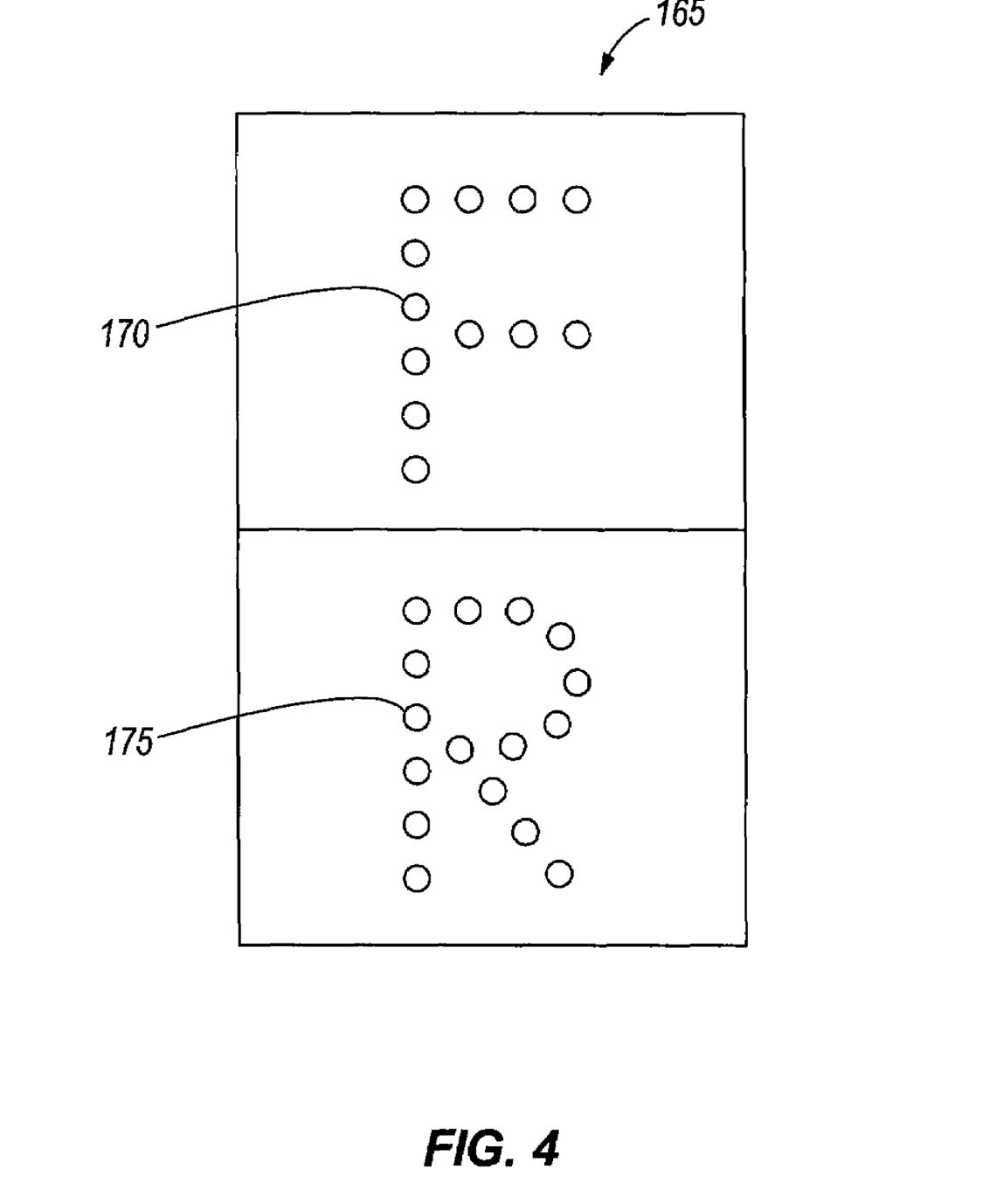
FIG. 4 is a schematic view of an indicator assembly of the vehicle of FIG. 1.

FIG. 4 shows one embodiment of the indicator assembly 165 that includes a first indicator 170 configured to indicate the first state, and a second indicator 175 located adjacent to and below the first indicator 170 and configured to indicate the second state. The first and second indicators 170, 175 each include a light source that selectively illuminates in response to the orientation of the cabin 110. For example, the first indicator 170 is illuminated in response to the cabin 110 being oriented in the forward-facing direction. The second indicator 175 is illuminated in response to the cabin 110 being oriented in the rearward-facing direction. In other embodiments, the first state and the second state can be indicated by a single indicator. In these embodiments, the single indicator can be deactivated to indicate one of the first state and the second state, and can be activated or illuminated to indicate the other of the first state and the second state.

FIG. 4 illustrates the first and second indicators 170, 175 as light emitting diode light sources. The illustrated first indicator 170 has a shape similar to the letter "F" that illuminates to indicate to the operator that the cabin is oriented in the forward-facing direction. The illustrated second indicator 175 has a shape similar to the letter "R" that illuminates to indicate that the cabin is oriented in the rearward facing direction. In some embodiments, the first indicator 170 can include a first colored light source (e.g., green, etc.), and the second indicator can include a second colored light source that is the same or different from the first colored light source (e.g., red, etc.). In other embodiments, the first and second indicators 170, 175 can have other shapes or colors to indicate the forward-facing and rearward facing directions.

The vehicle 10 further includes a direction control system 180 and a switch or selector 185. The direction control system 180 is in communication with the transmission 85 via the transmission control device 150, and can be enabled to facilitate movement of the vehicle 10 in the direction of orientation of the cabin 110, regardless of the cabin 110 being oriented in the forward-facing direction or the rearward-facing direction. As described below, in some embodiments, the direction control system 180 can be selectively enabled via the switch 185 to facilitate movement the vehicle in the direction of orientation of the cabin 110 regardless of cabin orientation. In other embodiments, the direction control system 180 can be automatically enabled based on an orientation of the cabin 110. The direction control system 180 can be an electrical system disposed on the vehicle 10 and coupled to the transmission 85. Alternatively, the direction control system 180 can be a mechanical, hydraulic, or other system capable of moving the vehicle 10 in the direction of orientation of the cabin 110, regardless of cabin orientation.

The vehicle 10 is in a normal state when the direction control system 180 is disabled, and is in an always forward state when the direction control system 180 is enabled. Operation of the vehicle 10 in the normal state and in the always forward state is described in detail below. In some embodiments, the direction control system 180 is coupled to a hydraulic circuit (not shown) that has a valve or other similar device in communication with the transmission 85 to selectively place the vehicle 10 in the always forward state. In other embodiments, the direction control system 180 may be coupled to a mechanical or electro-mechanical circuit in communication with the transmission 85 to selectively place the vehicle 10 in the always forward state.

The switch 185 is located in the cabin 110 for engagement by the operator from within the cabin 110, and is in communication with the direction control system 180 via an electrical, mechanical, and/or hydraulic connection. The switch 185 allows the direction control system 180 to be selectively enabled by the operator, and includes a first position that is indicative of the direction control system 180 being disabled, and a second position that is indicative of the direction control system 180 being enabled. In some embodiments, the switch 185 can be a toggle switch movable between the first position and the second position. In other embodiments, other switch mechanisms that can enable and disable the direction control system 180 are possible.

In some embodiments, a switch sensor 190 is coupled to the switch 185 to detect whether the direction control system 180 is enabled or disabled. In these embodiments, the switch sensor 190 can sense the position of the switch 185, and generate a signal indicative of the direction control system 180 being enabled or disabled based on the position of the switch 185. In other embodiments, whether the direction control system 180 is enabled or disabled can be detected based on the signal provided to the transmission control device 150 by the switch 185 (e.g., via the hydraulic or mechanical circuit, etc.). In still other embodiments, whether the direction control system 180 is enabled or disabled can be detected by a sensor directly in communication with the direction control system 180.

FIG. 3 shows that a controller 195 is coupled to the vehicle 10, and is in communication with the direction control sensor 155 to receive the signal indicative of chassis movement, and with the cabin sensor 160 to receive the signal indicative of cabin orientation. The controller 195 is further in communication with the indicator assembly 165 to vary the indicator assembly 165 between the first state and the second state (e.g., by varying the indicator assembly 165 between the first indicator 170 and the second indicator 175) in response to the signal indicative of the sensed cabin orientation from the cabin sensor 160. The indicator assembly 165 is variable by the controller 195 between the first state and the second state when the orientation of the cabin 110 is changed between the forward-facing direction and the rearward-facing direction.

The signal indicative of chassis movement from the direction control sensor 155 defines a first vehicle parameter, and the signal indicative of cabin orientation (e.g., from the cabin orientation control 130, the cabin sensor 160) defines a second vehicle parameter. The first vehicle parameter is in an active state when the signal indicative of chassis movement indicates that the chassis 25 is moving in the forward direction 15 or the rearward direction 20. The first vehicle parameter is in an inactive state when the signal indicative of chassis movement indicates that the chassis 25 is stationary. The second vehicle parameter is in an active state when the signal indicative of cabin orientation indicates that the cabin 110 is rotating about the vertical axis 80. The second vehicle parameter is in an inactive state when the signal indicative of cabin orientation indicates that the cabin 110 is stationary.

The controller 195 is further in communication with the transmission control device 150, the direction control system 180, and/or the switch 185 to receive the signal indicative of whether the direction control system 180 has been enabled. The signal indicative of whether the direction control system 180 is enabled or disabled defines a direction control system parameter that is used by the controller 195 to control movement of the vehicle 10. The direction control system parameter is in an active state when the direction control system 180 is enabled, and is in an inactive state when the direction control system 180 is disabled.

The controller 195 includes an override system 200 that is in communication with the direction control system 180 and the transmission 85 via the transmission control device 150 to selectively override the direction control system 180 based on the state of the first and second vehicle parameters, and whether the direction control system parameter is indicative of the direction control system 180 being enabled or disabled.

In operation, the vehicle 10 can be moved in the forward and rearward directions 15, 20 by engaging the chassis movement control 135. Generally, the vehicle direction controls 145 are moved forward relative to the seat 115 to move the vehicle 10 in the forward direction 15 when the direction control system 180 is disabled. Similarly, the vehicle direction controls 145 are moved rearward relative to the seat 115 to move the vehicle 10 in the rearward direction 20 when the direction control system 180 is disabled.

The working attachment 35 and the cabin 110 can be rotated about the vertical axis 80 in a clockwise or counterclockwise direction by engaging the cabin orientation control 130. The cabin 110 can rotate relative to the chassis 25 while the vehicle 10 is moving or stationary. The cabin sensor 160 senses the orientation of the cabin 110 relative to the chassis 25, generates a signal indicative of the cabin orientation, and delivers the signal to the controller 195. The controller 195 varies the indicator assembly 165 from the first state to the second state when the cabin sensor 160 detects that the cabin orientation has changed from the forward-facing direction to the rearward-facing direction. The controller 195 varies the indicator assembly 165 from the second state to the first state when the cabin sensor 160 detects that the cabin orientation has changed from the forward-facing direction to the rearward-facing direction. The controller 195 activates the first state of the indicator assembly 165 and deactivates the second state of the indicator assembly 165 when the signal is indicative of the cabin 110 in the forward-facing direction. The controller 195 deactivates the first state of the indicator assembly 165 and activates the second state of the indicator assembly 165 (e.g., illuminates the second indicator 175) when the signal is indicative of the cabin 110 in the rearward-facing direction.

In embodiments that include the first indicator 170 and the second indicator 175, the first indicator 170 is deactivated and the second indicator 175 is illuminated when the cabin 110 is re-oriented from the forward-facing direction to the rearward-facing direction. The first indicator 170 is illuminated and the second indicator 175 is deactivated when the cabin 110 is re-oriented from the rearward-facing direction to the forward-facing direction.

The vehicle 10 operates in the normal state when the direction control system 180 is disabled. The normal state is defined by the transmission 85 being operated such that the direction of movement of the chassis 25 using the chassis movement control 135 does not depend on the orientation of the cabin 110. In the normal state, the chassis movement control 135 moves the chassis 25 in the forward direction 15 when the vehicle direction controls 145 are engaged in a forward position. Likewise, the chassis 25 moves in the rearward direction 20 when the vehicle movement controls 145 are engaged in a rearward position. The cabin 110 can be oriented in the forward-facing direction or the rearward-facing direction in the normal state.

The forward position of the vehicle direction controls 145 when the vehicle 10 is in the normal state is generally indicative of forward chassis movement, and the rearward position of the vehicle direction controls 145 when the vehicle 10 is in the normal state is generally indicative of rearward chassis movement. For example, the chassis 25 moves in the forward direction 15 when the cabin 110 is in the rearward-facing direction and the vehicle movement controls 145 are engaged in the forward position. Likewise, the chassis 25 moves in the rearward direction 20 when the cabin 110 is in the rearward-facing position and the vehicle movement controls 145 are engaged in the rearward position.

The chassis movement control 135 moves the chassis 25 based on the orientation of the cabin 110 when the direction control system 180 is enabled and the vehicle 10 is in the always forward state. The direction control system 180 is enabled by moving the switch 185 from the first position to the second position. The always forward state is defined by the transmission 85 being operated such that the direction of movement of the chassis 25 using the chassis movement control 135 is dependent on the orientation of the cabin 110.

When the vehicle 10 is in the always forward state, the vehicle direction controls 145 can be engaged in the forward position to move the chassis 25 in the direction that the cabin 110 is facing, and to be engaged in the rearward position to move the chassis 25 in a direction opposite the cabin-facing direction. For example, when the cabin 110 is oriented in the forward-facing direction and the vehicle 10 is in the always forward state (i.e., the direction control system is enabled), the vehicle direction controls 145 can be engaged in the forward position to move the chassis 25 in the forward direction 15, and can be engaged in the rearward position to move the chassis 25 in the rearward direction 20.

When the cabin 110 is oriented in the rearward-facing direction and the vehicle 10 is in the always forward state, the vehicle direction controls 145 can be engaged in the forward position to move the chassis 25 in the rearward direction 20, and can be engaged in the rearward position to move the chassis 25 in the forward direction 15. The signal indicative of the direction control system 180 being enabled or disabled can be generated by the switch sensor 190 based on the position of the switch 185, or based on the signal provided to the transmission 85 via the switch 185. The override system 200 selectively aborts or overrides the signal indicative of the direction control system 180 being enabled (i.e., the direction control system parameter is in an active state) when at least one of the first and second vehicle parameters is in the active state. In other words, movement of the switch 185 from the first position to the second position does not enable the direction control system 180 when at least one of the first and second vehicle parameters is in the active state.

More particularly, the direction control system 180 cannot be enabled when the first vehicle parameter is indicative of the chassis 25 moving in the forward direction 15 or rearward direction 20 despite the switch 185 being moved from the first position to the second position. The direction control system 180 also is not enabled when the second vehicle parameter is indicative of the cabin 110 being rotated about the vertical axis 80 despite the switch 185 being moved from the first position to the second position. For example, when the cabin 110 is rotated from the forward-facing direction toward the rearward-facing direction, or from the rearward-facing direction to the forward-facing direction with the direction control system 180 enabled, the override system 200 overrides the signal from the direction control system 180 to the transmission 85.

The direction control system 180 can be enabled when the first and second vehicle parameters are in the respective inactive states. In some embodiments, the override system 200 overrides the signal from the switch sensor 190 when at least one of the first and second vehicle parameters is in the respective active state. In other embodiments, the override system 200 overrides the signal from the switch sensor 190 when the first vehicle parameter is in the active state and the second vehicle parameter is in the active state. In these embodiments, the direction control system 180 can be enabled when only one of the first and second vehicle parameters is in the active state.

In some embodiments, when the direction control system 180 is enabled (i.e., the vehicle 10 is in the always forward state) and the cabin 110 is oriented in the rearward-facing direction, the steering mechanism 140 must be operated in a manner that is opposite of operation of the steering mechanism 140 when the cabin 110 is oriented in the forward-facing direction when the direction control system 180 is disabled (i.e., the vehicle is in the normal state). In other words, operation of the steering mechanism 140 with the direction control system 180 enabled and the cabin 110 oriented in the rearward-facing direction to turn the vehicle 10 in a desired direction is opposite operation of the steering mechanism 140 with the direction control system 180 disabled and the cabin 110 oriented in the rearward-facing direction to accomplish the same desired turning direction.

For example, the steering mechanism 140 can be engaged in a first direction to turn the vehicle 10 toward the left (i.e., movement of the vehicle 10 in a generally counter-clockwise direction) when the direction control system 180 is disabled and the cabin 110 is in the rearward-facing direction. However, when the cabin 110 is oriented in the rearward-facing direction and the direction control system 180 is enabled, engagement of the steering mechanism 140 in the first direction would result in turning the vehicle 10 toward the right (i.e., generally clockwise direction). In these embodiments, when the direction control system 180 is enabled and the cabin 110 is in the rearward-facing direction, the steering mechanism 140 must be engaged in a second direction different from the first direction to turn the vehicle 10 in the desired direction (i.e., toward the left in the example discussed above).

The indicator assembly 165 can assist the operator with understanding whether the steering mechanism 140 will operate in a normal or reverse manner, as described above. For example, activation of the first indicator 170 indicates to the operator that the cabin 110 is oriented in the forward-facing direction, and that the steering mechanism 140 will operate normally to turn the vehicle 10 in the desired direction. In other words, for example, activation of the first indicator 170 will indicate that movement of the steering mechanism 140 in the first direction will turn the vehicle 10 toward the left. Activation of the second indicator 175 indicates to the operator that the cabin 110 is oriented in the rearward-facing direction, and that the steering mechanism 140 will operate in a reverse manner to turn the vehicle 10 in the desired direction. Thus, continuing with the example discussed above, activation of the second indicator 175 will indicate that movement of the steering mechanism 140 in the first direction will turn the vehicle toward the right.

Various features and advantages of the invention are set forth in the following claims.

What is claimed is:

1. A system for a vehicle that includes a movable chassis and an operator station rotatable relative to the chassis, the system comprising:
   a sensor configured to detect an orientation of the operator station relative to the chassis and to generate a signal indicative of the orientation of the operator station;
   an indicator assembly disposed in the operator station, the indicator assembly including a first indicator indicative of the operator station oriented in a first direction, and a second indicator indicative of the operator station oriented in a second direction; and
   a controller in communication with the sensor to receive the signal indicative of the operator station orientation from the sensor, the controller further in communication with the indicator assembly to selectively vary the indicator assembly between the first indicator and the second indicator based on the signal indicative of the operator station orientation, the indicator assembly variable between the first indicator and the second indicator in response to the sensor detecting a change in the operator station orientation between a forward-facing direction and a rearward-facing direction.

2. The system of claim 1, wherein the first indicator is indicative of the operator station being oriented in the forward-facing direction, and wherein the second indicator is indicative of the operator station being oriented in the rearward-facing direction.

3. The system of claim 1, wherein the second indicator is positioned adjacent to the first indicator.

4. The system of claim 3, wherein the first indicator includes a light source that illuminates in response to the operator station being oriented in the forward-facing direction.

5. The system of claim 3, wherein the second indicator includes a light source that illuminates in response to the operator station being oriented in the rearward-facing direction.

6. A method of operating a system for a vehicle that includes a movable chassis and an operator station rotatable relative to the chassis, the method comprising:
   sensing an orientation of the operator station relative to the chassis with a sensor;
   generating a signal indicative of the operator station orientation;
   delivering the signal to a controller;
   selectively varying an indicator assembly between a first indicator and a second indicator of the indicator assembly based on the signal indicative of the operator station orientation, the indicator assembly disposed in the operator station;
   illuminating the first indicator when the operator station is oriented in a forward-facing direction;
   illuminating the second indicator when the operator station is oriented in a rearward-facing direction;
   detecting a change in the orientation of the operator station between the forward-facing direction and the rearward-facing direction; and
   varying the indicator assembly between the first indicator and the second indicator using the controller in response to detecting the change in the operator station orientation.

7. The method of claim 6, further comprising
   orienting the operator station in the forward-facing direction;
   generating a signal indicative of the operator station oriented in the forward-facing direction;
   delivering the signal indicative of the operator station oriented in the forward-facing direction to the controller; and
   activating the first indicator in response to the operator station being oriented in the forward-facing direction.

8. The method of claim 7, further comprising
   orienting the operator station in the rearward-facing direction;
   generating a signal indicative of the operator station oriented in the rearward-facing direction;

delivering the signal indicative of the operator station being oriented in the rearward-facing direction to the controller; and varying the indicator assembly from the first indicator to the second indicator in response to the signal indicative of the operator station being oriented in the rearward-facing direction.

9. The method of claim 6, wherein illuminating the first indicator includes deactivating the second indicator.

10. The method of claim 6, wherein illuminating the second indicator includes deactivating the first indicator.

11. A method of operating a vehicle that includes a movable chassis having a forward end and a rearward end, an operator station rotatable relative to the chassis, and a chassis movement control, the method comprising:

providing a direction control system in communication with a transmission of the chassis;

providing a switch mechanism in communication with the direction control system;

orienting the operator station in one of a forward-facing direction and a rearward-facing direction;

enabling the direction control system by engaging the switch mechanism;

engaging the chassis movement control and moving the chassis movement control in a direction indicative of forward chassis movement;

moving the vehicle in the direction of orientation of the operator station in response to the direction control system being enabled regardless of the operator station being oriented in the forward-facing direction or the rearward-facing direction;

disabling the direction control system;

engaging the chassis movement control in a direction indicative of forward vehicle movement; and moving the chassis in the forward-facing direction in response to the direction control system being disabled and regardless of the operator station orientation.

12. The method of claim 11, further comprising orienting the operator station in the rearward-facing direction; and moving the chassis in the rearward-facing direction in response to the direction control system being enabled and the chassis movement control being moved in a direction indicative of forward chassis movement.

13. The method of claim 12, further comprising varying the orientation of the operator station from the rearward-facing direction to the forward-facing direction; and moving the chassis in the forward-facing direction in response to the direction control system being enabled and the chassis movement control being moved in a direction indicative of forward chassis movement.

14. The method of claim 11, further comprising indicating the orientation of the operator station.

15. The method of claim 14, wherein indicating the orientation of the operator station includes sensing the orientation of the operator station;

illuminating an indicator of the vehicle in one of a first state and a second state based on the orientation of the operator station in the forward-facing direction; and illuminating the indicator in the other of the first state and the second state based on the orientation of the operator station in the rearward-facing direction.

16. A method of operating a vehicle that includes a movable chassis having a forward end and a rearward end, an operator station rotatable relative to the chassis, and a chassis movement control, the method comprising:

providing a direction control system in communication with a transmission of the chassis;

providing a switch mechanism in communication with the direction control system;

orienting the operator station in one of a forward-facing direction and a rearward-facing direction;

enabling the direction control system by engaging the switch mechanism;

engaging the chassis movement control and moving the chassis movement control in a direction indicative of forward chassis movement;

moving the vehicle in the direction of orientation of the operator station in response to the direction control system being enabled regardless of the operator station being oriented in the forward-facing direction or the rearward-facing direction;

sensing a parameter of the vehicle;

generating a first signal indicative of the vehicle parameter;

sensing a parameter of the direction control system;

generating a second signal indicative of the direction control system parameter;

delivering the first signal and the second signal to a controller; and overriding the second signal in response to the first signal indicative of the vehicle parameter in an active state when the second signal is indicative of the direction control system being enabled.

17. The method of claim 16, further comprising enabling the direction control system when the first signal is indicative of the vehicle parameter in an inactive state.

18. The method of claim 17, wherein sensing the vehicle parameter in an active state includes sensing at least one of movement of the chassis and rotation of the operator station.

19. The method of claim 18, wherein sensing the vehicle parameter in an active state includes sensing movement of the chassis and/or rotation of the operator station.

20. The method of claim 17, wherein sensing the vehicle parameter in an inactive state includes sensing the vehicle in a stationary state.

21. The method of claim 16, wherein sensing the direction control system parameter includes sensing the direction control system being in one of an enabled state and a disabled state.

22. The method of claim 16, wherein overriding the second signal includes sensing the direction control system parameter indicative of the direction control system being enabled.

23. The method of claim 11, further comprising operating the switch mechanism from inside the operator station to enable or disable the direction control system.

24. A system for a vehicle that includes a movable chassis having a transmission, a forward end and a rearward end, an operator station rotatable relative to the chassis, and a chassis movement control, the system comprising:

a sensor configured to detect an orientation of the operator station relative to the chassis and to generate a signal indicative of the orientation of the operator station;

an indicator assembly disposed in the operator station, the indicator assembly including a first state indicative of the operator station oriented in a first direction, and a second state indicative of the operator station oriented in a second direction;

a direction control system in communication with the transmission and with the chassis movement control, the direction control system operable to facilitate movement of the vehicle in the direction of orientation of the operator station in response to engagement of the chassis movement control in a direction indicative of forward chassis movement regardless of the operator station being oriented in the forward-facing direction or the rearward facing direction; and a controller in communication with the sensor to receive the signal indicative of the operator station orientation from the sensor, the controller further in communication with the indicator assembly to selectively vary the indicator assembly between the first state and the second state based on the signal indicative of the operator station orientation, the indicator assembly variable between the first state and the second state in response to the sensor detecting a change in the operator station orientation between a forward-facing direction and a rearward-facing direction.

25. The system of claim 24, wherein the indicator assembly includes a first indicator configured to indicate the first state, and a second indicator configured to indicate the second state.

26. The system of claim 24, further comprising a switch mechanism in communication with the direction control system, wherein the direction control system is selectively enabled by engagement of the switch mechanism.

27. The system of claim 24, further comprising the controller in communication with the direction control system, wherein the controller is operable to automatically enable the direction control system regardless of the operator station orientation.

* * * * *